Patented June 10, 1947

2,421,937

UNITED STATES PATENT OFFICE 2,421,937

PRODUCTION OF IMINES

Vernon E. Haury, El Cerrito, Calif., assignor to Shell Development Company, San Francisco, Calif., a corporation of Delaware No Drawing. Application April 5, 1944, Serial No. 529,873

17 Claims. (Cl. 260—566)

This invention relates to the production of imines. It relates particularly to a novel method for the production of N-substituted imines which comprises dehydrogenating a secondary amine.

The N-substituted imines which are prepared in accordance with the process of the invention are organic compounds which contain a trivalent nitrogen atom directly linked by two of its valence bonds to a single carbon atom, and by its other bond to another carbon atom. In other words, the imines are characterized by containing the structural grouping

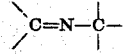

It has been found that such N-substituted imines may be prepared directly from the secondary amines of corresponding structure by catalytically dehydrogenating the secondary amines. More specifically stated, the process of the invention comprises contacting a secondary amine, wherein the —NH— group is directly linked to two carbon atoms at least one of which is directly linked to a hydrogen atom, with a dehydrogenation catalyst at a dehydrogenation temperature, i. e. a temperature sufficiently elevated to effect the removal of a hydrogen atom from the said hydrogen-bearing carbon atom and another hydrogen atom from the contiguous nitrogen atom, thereby causing the formation of a carbon-nitrogen double bond and resulting in the desired imine.

One of the more specific embodiments of the invention may be represented by the process which may be employed for the dehydrogenation of a secondary amine having at least one alkyl group directly linked to the —NH— group through a single bond of a carbon atom which is also attached to a hydrogen atom of the alkyl group. Such a compound, e. g. di(1,3-dimethylbutyl) amine, may be converted to the corresponding imine, e. g. N(1,3-dimethylbutyl) methyl isobutyl ketimine, by contacting the said secondary amine with a dehydrogenation catalyst, e. g. an active nickel catalyst, at a temperature of between about 100° C. and about 500° C. The ensuing reaction, which results in the elimination of hydrogen from the molecular structure of the secondary amine with the formation of the desired imine, may be represented by the following equation:

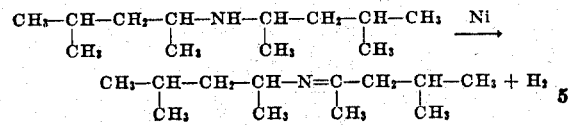

The process of the invention may be applied with suitable modifications to the production of a wide variety of N-substituted imines from the corresponding secondary amines. Representative secondary amines suitable for use in the execution of the process are, for example: dimethylamine, methylethylamine, n-propylmethylamine, n-propylethylamine, di-n-propylamine, isopropylmethylamine, isopropylethylamine, isopropyl - n - propylamine, di - isopropylamine, n-butylmethylamine, n-butylethylamine, n-butyl-n-propylamine, n - butylisopropylamine, di-n-butylamine, sec - butylmethylamine, sec - butylethylamine, sec-butyl-n-propylamine, sec-butylisopropylamine, sec - butyl - n - butylamine, sec-butylisobutylamine, sec-butyl - tert - butylamine, di - sec - butylamine, isobutylmethylamine, isobutylethylamine, isobutyl - n - propylamine, isobutylisopropylamine, isobutyl-n-butylamine, isobutyl-tert-butylamine, di - isobutylamine, tert-butylmethylamine, tert-butylethylamine, tert-butyl-n-propylamine, tert - butylisopropylamine, tert-butyl-n-butylamine, the tert-pentylmethylamines, the tert - pentylethylamines, pentylisopropylamine, pentyl - n - butylamine, pentyl-sec-butylamine, pentylisobutylamine, the non-tert-dipentylamines, the tert-hexylethylamines, hexylmethylamine, hexyl - n - propylamine, hexylisopropylamine, hexyl - n - butylamine, hexyl-sec-butylamine, hexylisobutylamine, hexylpentylamine, the non - tert - dihexylamines, 1,3 - dimethylbutylmethylamine, 1,3 - dimethylbutylethylamine, 1,3 - dimethylbutyl-n-propylamine, 1,3-dimethylbutylisopropylamine, 1,3 - dimethylbutyl - n - butylamine, 1,3-dimethylbutylisobutylamine, 1,3 - dimethylbutyl - sec-butylamine, 1,3-dimethylbutyl - tert - butylamine, 1,3-dimethylbutylpentylamine, di(1,3- dimethylbutyl) amine, isopropylheptylamine, isopropyloctylamine, isopropylnonylamine, isopropyldecylamine, isoproylheptadecylamine, isopropyloctadecylamine, isopropylallyamine, isopropylmethallylamine, isopropylcrotylamine, isopropylstyrylamine, sec-butylheptylamine, sec-butyloctylamine, sec-butylnonylamine, sec-butyldecylamine, sec-butyloctadecylamine, sec-butylheptadecylamine, sec-butylallylamine, sec - butylmethallylamine, sec-butylcrotylamine, sec-butylstyrylamine, 1,3-dimethylbutylheptylamine, 1,3-dimethylbutyloctylamine, 1,3 - dimethylbutylnonylamine, 1,3 - dimethylbutyldecylamine, 1,3-dimethylbutylheptadecylamine, 1,3-dimethylbutyloctadecylamine, 1,-3- dimethylbutylallylamine, 1,3 - dimethylbutylmethallylamine, 1,3 - dimethylbutylcrotylamine, 1,3-dimethylbutylstyrylamine, dicyclohexylamine, 1,3 - dimethylbutylcyclohexylamine, isopropyl - 2- methylcyclohexylamine, the phenyl alkyl amines wherein the alkyl group contains from one to about twenty carbon atoms and is attached to the nitrogen atom through a non-tertiary carbon atom, tolylisopropylamine, tolyl-sec-butylamine, tolyl-1,3-dimethylbutylamine, xylyl-isopropylamine, xylyl-sec-butylamine, xylyl-1,3-dimethylbutylamine, naphthylisopropylamine, naphthyl-sec-butylamine, naphthyl-1,3-dimethylbutylamine, and the suitable homologues, analogues and substitution products of the above compounds.

Suitable substitution products are those compounds which contain non-interfering substituent groups, i. e. groups which are non-reactive under the conditions of the reaction. Suitable substituent groups may be, for example, the keto, ether and ester groups and the like. Compounds containing certain substituent groups which are reactive under the conditions of the reaction may, in some instances, be employed as starting materials for the synthesis. Thus, compounds containing the hydroxyl group which may be dehydrogenated to a keto group when subjected to the action of a dehydrogenation catalyst at elevated temperatures may be employed if it is desired to prepare a keto-substituted imine. Similarly, a compound containing an olefinic linkage may be employed. In this case the olefinic linkage may be reduced with the resultant formation of a saturated compound, however, by the hydrogen which is a product of the dehydrogenation of the secondary amine.

Imines may be prepared in accordance with the process disclosed herein by dehydrogenating a single secondary amine, thus forming a single imine as a product. However, if it is desired to prepare a mixture of imines, this may be accomplished by dehydrogenating a mixture of different species of secondary amines. The resulting mixture of imines may be used without resorting to the separation of the constituents or, if desired, separation of the imines may be effected by any suitable means, as by fractional distillation, if there is a sufficiently great difference in the boiling temperatures of the imines.

As will be readily apparent from a consideration of the mechanism of the dehydrogenation reaction involved, two different imines may, in some cases, result from the reaction even when a single secondary amine is used as a starting material. This is the case when the secondary amine is of such a structure that two different alkyl groups are attached through hydrogen-bearing carbon atoms to the nitrogen atom of the secondary amino group. Thus, isopropyl secondary butyl amine, $$CH_3-CH-NH-CH-CH_2-CH_3$$
$$\quad\ \ |\qquad\qquad\ |$$
$$\quad CH_3\qquad\quad\ CH_3$$

may be dehydrogenated to form either N(isopropyl) methyl ethyl ketimine,

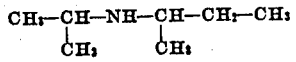

or N(1-methyl propyl) dimethyl ketimine,

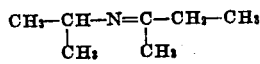

or a mixture of the two isomers, depending upon which hydrogen atoms are involved in the dehydrogenation process. When a mixture of isomers is formed, this mixture may be used as such or separated into its constituent isomers by any suitable means, as by fractional distillation.

Although the process of the invention may usually be advantageously applied to the dehydrogenation of secondary amines with the resultant formation of the imines of corresponding structure, as described hereinabove, it may be desirable or necessary in some instances to use as starting materials for the synthesis a compound or compounds other than secondary amines which may react directly under the reaction conditions to form an imine or which may be first converted to a secondary amine intermediate which is then dehydrogenated to the imine. The primary amines, for example, are compounds which may react in this fashion, provided that the said primary amines are of such a structure as to be capable of forming a secondary amine intermediate which may be dehydrogenated to form an imine. In other words, the primary amine should be of such a nature as to combine under the conditions of the reaction to form a secondary amine wherein the —NH— group is directly linked to two carbon atoms, at least one of which is directly linked to a hydrogen atom. When such a primary amine is contacted with a hydrogenation-dehydrogenation catalyst such as active nickel at a reaction temperature and pressure, two molecules of the primary amine may be caused to split off ammonia and combine to form a single molecule of a secondary amine which may be subsequently or concurrently dehydrogenated under the conditions of the reaction to form the desired imine.

Thus, in one embodiment of the invention, a primary amine, e. g. dihydroisophoryl amine (3,3,5-trimethylcyclohexyl amine), may be contacted with a hydrogenation-dehydrogenation catalyst comprising active nickel or alumina. The reaction which occurs probably leads first to the formation of di-dihydroisophoryl amine (di-3,3,5-trimethylcyclohexyl amine) and free ammonia. Under the reaction conditions employed, however, the di-dihydroisophoryl amine is dehydrogenated substantially as soon as it is formed with the resultant formation of N(dihydroisophoryl) dihydroisophoronimine, [N(3,3,5-trimethylcyclohexyl) 3,3,5-trimethylcyclohexanonimine]. The reactions taking place may be illustrated by the following equations:

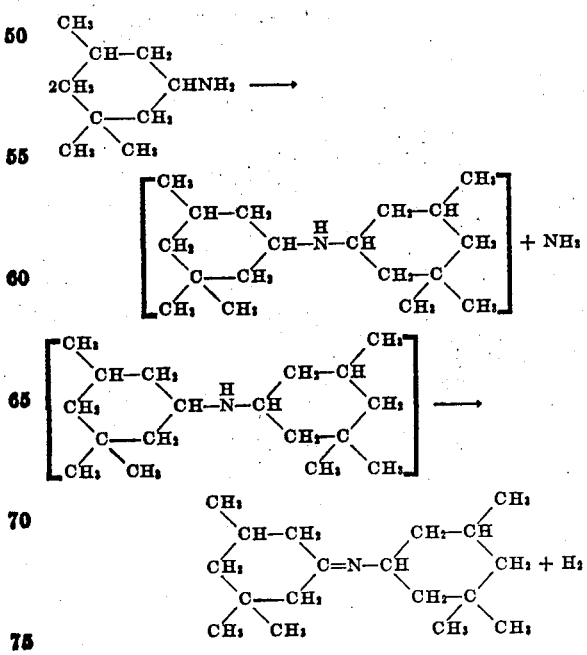

The process of the invention may be executed in a batch, intermittent or continuous manner. When carrying out the process in a batch manner, a quantity of the secondary amine to be dehydrogenated, together with a suitable quantity of a catalyst, e. g. an active nickel catalyst, may be heated to a temperature sufficiently elevated to effect the dehydrogenation of the secondary amine and the formation of the desired imine, the hydrogen which is a product of the reaction being allowed to escape from the reaction vessel. When the reaction is complete the reaction mixture may be distilled to separate the imine from the product. When carrying out the process in a continuous manner, a stream of the secondary amine starting material in either the liquid or vapor phase may be continuously contacted with a quantity of catalyst, e. g. an active nickel catalyst, in pellet form contained in a suitable reaction chamber, the reaction mixture being continuously withdrawn from the said reaction chamber and the imine product separated from any unreacted secondary amine. The latter may, if desired, be recycled to the reaction chamber.

Any material which is active as a hydrogenation-dehydrogenation catalyst may be used to effect the dehydrogenation of the secondary amine in accordance with the process of the invention. Suitable catalysts, therefore, include such materials as finely-divided nickel, nickel-on-kieselguhr, nickel-on-pumice, colloidal platinum, finely-divided palladium, metallic chromium, alumina, iron oxide-chromium oxide compositions, copper oxide-chromium oxide compositions, and the like. A preferred group of catalysts comprises the metal dehydrogenation catalysts, that is, the catalysts consisting of or comprising a dehydrogenating metal. Active nickel catalysts have proved particularly effective, active nickel in the form commonly referred to as Raney nickel being a preferred catalyst for carrying out the dehydrogenation process. The catalyst may be used in any suitable amount, the amount used being dependent upon the nature of the catalyst, the character of the reacting substances, the operating conditions of the reaction, etc. In general, however, an amount of catalyst ranging from between about 0.5% and about 10.0%, preferably about 5%, based on the amount of secondary amine, represents a suitable amount when carrying out the process in the liquid phase in a batch manner. In continuous operation a sufficient amount of catalyst should be used to secure the desired conversion within the contact time employed.

The temperature to be employed is variable depending upon the nature of the starting material and the other operating conditions, but, in general, will be between about 100° C. and about 500° C. When carrying out the reaction in the liquid phase, the preferred temperature range is between about 180° C. and about 200° C. When operating in the vapor phase somewhat higher temperatures, e. g. temperatures of between about 350° C. and about 500° C. may be employed.

The reaction may usually be carried out at atmospheric pressure. If desirable or necessary, however, as in the case where low-boiling secondary amines which tend to vaporize at the reaction temperature are used as starting materials, slightly elevated pressure, i. e. pressure of up to about 10 atmospheres may be employed to keep the reaction mixture in the liquid phase. In some cases, it may be desirable to effect the dehydrogenation under a subatmospheric pressure.

The reaction time may be varied to suit the needs of each particular reaction but may be between about 1 hour and about 20 hours, preferably between about 5 hours and about 10 hours, when operating in the liquid phase. When operating in the vapor phase at higher temperatures a contact time of from about 10 seconds to about 60 seconds is usually adequate to secure the desired conversion.

It may, in some instances, be desirable to employ a solvent for the secondary amine and/or the resulting imine or imines. This may be done, for example, when it is desired to dehydrogenate in the liquid phase a high-boiling viscous amine which is handled with difficulty because of its viscous nature. Any non-reactive solvent material in which the secondary amine is soluble may be employed. Suitable solvents are, for example, the paraffin hydrocarbon solvents such as hexane, heptane, iso-octane and the aromatic hydrocarbon solvents such as benzene, toluene and xylene. Since hydrogen is a product of the reaction, it may, in some cases, facilitate the dehydrogenation process if an unsaturated hydrocarbon solvent, such as cyclohexene or tri-isobutylene, or a ketone solvent such as acetone, methyl ethyl ketone, diethyl ketone, di-isobutyl ketone, isophorone and the like are used, since such unsaturated hydrocarbons and ketones may act as acceptors for the hydrogen as it is produced and thus promote the dehydrogenation of the secondary amine to the desired imine.

The procedure outlined herein thus provides a ready and economical method for preparing a wide variety of imines which are useful as constituents of insecticidal compositions, as compounding agents for rubber and as intermediates in the synthesis of other types of valuable organic compounds. The process is especially valuable in that it makes possible the use of a new class of starting materials, i. e. the secondary amines, for the synthesis of the imines of corresponding structure. The process may thus be used to advantage in conjunction with the processes heretofore known for reacting ketones with ammonia or amines and hydrogen in the presence of a hydrogenation catalyst thereby forming good yields of secondary amines which may then be converted to imines by the novel process disclosed herein.

The process of the invention may be illustrated by the following examples.

*Example I*

N(1,3-dimethylbutyl) methyl isobutyl ketimine was prepared by heating di-(1,3-dimethylbutyl) amine together with about 5% by weight of Raney nickel catalyst for 5 hours at 180° C. At this temperature the reaction mixture remained in the liquid phase. The imine product was separated from the reaction mixture by distillation. It boiled at about 110° C. at 50 mm. and yielded methyl isobutyl ketone and 1,3-dimethylbutyl amine upon hydrolysis.

*Example II*

3 parts of 3,3,5-trimethylcyclohexyl amine was heated with 1% Raney nickel for 8 hours at 180° C.–200° C. Distillation of the product yielded 1 part of N(3,3,5-trimethylcyclohexyl) 3,3,5-trimethylcyclohexanone imine which distilled at 145° C. to 148° C. at 10 mm. The imine product analyzed 81.8(4)% C, 12.5(9)% H, and 5.1(9)%

N, (calculated 82.05% C, 12.62% H, and 5.33% N) and had a specific gravity (sp. gr. 20/4) of 0.878 and a refractive index (R. I. 20/D) of 1.476. Hydrolysis of the imine resulted in the formation of approximately equimolecular quantities of 3,3,5-trimethylcyclohexanone and 3,3,5-trimethylcyclohexyl amine.

*Example III*

The imine described in Example II, i. e. N(3,3,5-trimethylcyclohexyl) 3,3,5 - trimethylcyclohexanone imine, was also prepared by passing vaporized 3,3,5-trimethylcyclohexyl amine over an alumina catalyst at a temperature of 460° C. to 490° C. and at a feed rate of 0.052 cc. of 3,3,5-trimethylcyclohexyl amine vapor per cc. of catalyst per minute. The imine product boiled at 136° C. to 138° C. at 6 mm. and upon hydrolysis gave 3,3,5-trimethylcyclohexanone and 3,3,5-trimethylcyclohexyl amine.

In a like manner the following imines are prepared from the indicated secondary amines, using either batch or continuous operating methods, operating in either the liquid phase or the vapor phase, and employing as catalysts either nickel, colloidal platinum, chromium, or chromium oxide-containing catalyst compositions: N(isopropyl) dimethyl ketimine from di-isopropyl amine, N(isobutyl) isobutyraldimine from di-sec-butyl amine, N(tert-butyl) n-butylaldimine from tert-butyl n-butyl amine, N(phenyl) methyl ethyl ketimine from phenyl sec-butyl ketimine, and N(tolyl) cyclohexanonimine from phenyl cyclohexylimine.

I claim as my invention:

1. A process for the production of imines which comprises contacting a secondary amine, in which the —NH— group is directly linked to two hydrocarbon radicals at least one being an alkyl group linked to the —NH— group by means of a carbon atom which is also directly linked to at least one hydrogen atom, with a dehydrogenation catalyst comprising a material of the group consisting of nickel metal, chromium metal, finely divided palladium metal, colloidal platinum metal, alumina, iron oxide, copper oxide and chromium oxide at about 100° C. to about 500° C. whereby one mole of free hydrogen is removed from said amine per mole of imine produced.

2. A process for the production of imines which comprises contacting an aliphatic secondary amine, in which the —NH— group is directly linked to at least one alkyl group by means of a carbon atom which is also directly linked to at least one hydrogen atom, with a catalyst comprising nickel metal at a temperature in the range of from about 100° C. to about 500° C.

3. A process for the production of N(1,3-dimethylbutyl) methyl isobutyl ketimine which comprises contacting di(1,3 - dimethylbutyl) amine with a dehydrogenation catalyst comprising a material of the group consisting of nickel metal, chromium metal, finely divided palladium metal, colloidal platinum metal, alumina, iron oxide, copper oxide and chromium oxide at about 100° C. to about 500° C.

4. A process for the production of N(1,3-dimethylbutyl) methyl isobutyl ketimine which comprises contacting di(1,3 - dimethylbutyl) amine with a nickel metal catalyst at a temperature in the range of from about 175° C. to about 200° C.

5. A process for the production of imines which comprises contacting a secondary amine, in which the —NH— group is directly linked by a single bond to two hydrocarbon radicals at least one being an alicyclic radical linked to the —NH— group by means of a carbon atom of the alicyclic nucleus which is also directly linked to at least one hydrogen atom, with a dehydrogenation catalyst comprising a material of the group consisting of nickel metal, chromium metal, finely divided palladium metal, colloidal platinum metal, alumina, iron oxide, copper oxide and chromium oxide at about 100° C. to about 500° C. whereby one mole of free hydrogen is removed from said amine per mole of imine produced.

6. A process for the production of imines which comprises contacting a secondary amine, in which the —NH— group is directly linked by a single bond to two hydrocarbon radicals at least one being an alkyl-substituted cyclohexyl radical linked to the —NH— group by means of a carbon atom in the nucleus of the cyclohexyl radical which is also directly linked to at least one hydrogen atom, with a dehydrogenation catalyst comprising a material of the group consisting of nickel metal, chromium metal, finely divided palladium metal, colloidal platinum metal, alumina, iron oxide, copper oxide and chromium oxide at about 100° C. to about 500° C. whereby free hydrogen is split off from said amine and it is converted to the corresponding alkyl cyclohexyl imine.

7. A process for the production of N(3,3,5-trimethylcyclohexyl) 3,3,5-trimethylcyclohexanonimine which comprises contacting 3,3,5-trimethylcyclohexylamine with a dehydrogenation catalyst containing a dehydrogenation catalyst comprising a material of the group consisting of nickel metal, chromium metal, finely divided palladium metal, colloidal platinum metal, alumina, iron oxide, copper oxide and chromium oxide at about 100° C. to about 500° C.

8. A process for the production of imines which comprises contacting a secondary amine, in which the —NH— group is directly linked by a single bond to two hydrocarbon radicals at least one being an alkyl-substituted cyclohexyl radical linked to the —NH— group by means of a carbon atom in the nucleus of the cyclohexyl radical which is also directly linked to at least one hydrogen atom, with a nickel metal catalyst at a temperature of from about 180° C. to about 200° C.

9. A process for the production of an imine which comprises contacting a dialkyl amine having alkyl groups of 1 to 20 carbon atoms attached to the —NH— group by means of carbon atoms which are each also directly linked to a hydrogen atom, with a dehydrogenation catalyst containing a dehydrogenation catalyst comprising a material of the group consisting of nickel metal, chromium metal, finely divided palladium metal, colloidal platinum metal, alumina, iron oxide, copper oxide and chromium oxide at about 100° C. to about 500° C.

10. A process for the production of an imine which comprises contacting an amine having two hydrocarbon radicals directly linked to a —NH— group, at least one of said radicals being attached to said —NH— group by a saturated carbon atom which is also directly linked to at least one hydrogen atom, with a dehydrogenation catalyst comprising a material of the group consisting of nickel metal, chromium metal, finely divided palladium metal, colloidal platinum metal, alumina, iron oxide, copper oxide and chromium oxide at about 100° C. to about 500° C. whereby one mole of free hydrogen is removed from said amine per mole of imine produced.

11. A process for the production of an imine which comprises contacting an amine having two hydrocarbon radicals directly linked to a —NH— group, at least one of said radicals being attached to said —NH— group by a saturated carbon atom which is also directly linked to at least one hydrogen atom, with a catalyst comprising nickel metal at about 100° C. to about 500° C. whereby one mole of free hydrogen is removed from said amine per mole of imine produced.

12. A process for the production of an imine which comprises contacting a dialkyl amine having alkyl groups of 1 to 20 carbon atoms attached to the —NH— group by means of carbon atoms which are each also directly linked to a hydrogen atom, with a catalyst comprising nickel metal at about 100° C. to about 500° C.

13. A process for the production of imines which comprises contacting a secondary amine, in which the —NH— group is directly linked to two hydrocarbon radicals at least one being an alkyl group linked to the —NH— group by means of a carbon atom which is also directly linked to at least one hydrogen atom, with a catalyst comprising nickel metal at about 100° C. to about 500° C. whereby one mole of free hydrogen is removed from said amine per mole of imine produced.

14. A process for the production of imines which comprises contacting a secondary amine, in which the —NH— group is directly linked by a single bond to two hydrocarbon radicals at least one being an alicyclic radical linked to the —NH— group by means of a carbon atom of the alicyclic nucleus which is also directly linked to at least one hydrogen atom, with a catalyst comprising nickel at about 100° C. to about 500° C. whereby one mole of free hydrogen is removed from said amine per mole of imine produced.

15. A process for the production of an imine which comprises contacting a dialkyl amine having alkyl groups of 1 to 20 carbon atoms attached to the —NH— group by means of carbon atoms which are each also directly linked to a hydrogen atom, with a catalyst comprising alumina at about 100° C. to about 500° C.

16. A process for the production of imines which comprises contacting a secondary amine, in which the —NH— group is directly linked to two hydrocarbon radicals at least one being an alkyl group linked to the —NH— group by means of a carbon atom which is also directly linked to at least one hydrogen atom, with a catalyst comprising alumina at about 100° C. to about 500° C. whereby one mole of free hydrogen is removed from said amine per mole of imine produced.

17. A process for the production of imines which comprises contacting a secondary amine, in which the —NH— group is directly linked by a single bond to two hydrocarbon radicals at least one being an alicyclic radical linked to the —NH— group by means of a carbon atom of the alicyclic nucleus which is also directly linked to at least one hydrogen atom, with a catalyst comprising alumina at about 100° C. to about 500° C. whereby one mole of free hydrogen is removed from said amine per mole of imine produced.

VERNON E. HAURY.

REFERENCES CITED

The following references are of record in the file of this patent:

UNITED STATES PATENTS

| Number | Name | Date |
|---|---|---|
| 640,563 | Homolka | Jan. 2, 1900 |
| 2,019,883 | Wulff | Nov. 5, 1935 |
| 2,045,574 | Adkins | June 30, 1936 |

OTHER REFERENCES

Belstein's Handbuch der Org. Chemie., 4th. ed., vol. 4, pp. 167–184.
Chem. Abstracts, vol. 35 (1941), p. 4785.
Chem. Abstracts, vol. 27 (1933), p. 5593.